United States Patent
Barry et al.

(10) Patent No.: US 10,148,303 B2
(45) Date of Patent: Dec. 4, 2018

(54) METHODS AND SYSTEMS FOR AQUATIC INFRASTRUCTURE RECHARGE AND DATA TRANSFER

(71) Applicant: INTERNATIONAL BUSINESS MACHINES CORPORATION, Armonk, NY (US)

(72) Inventors: Michael Barry, Limerick (IE); Fearghal O'Donncha, Galway (IE); Mark Purcell, Johnstown (IE); Emanuele Ragnoli, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/398,376

(22) Filed: Jan. 4, 2017

(65) Prior Publication Data
US 2018/0191390 A1    Jul. 5, 2018

(51) Int. Cl.
| | |
|---|---|
| *H04B 1/38* | (2015.01) |
| *H04B 1/3822* | (2015.01) |
| *H04W 4/021* | (2018.01) |
| *H04W 4/04* | (2009.01) |
| *H04B 5/00* | (2006.01) |

(52) U.S. Cl.
CPC ......... *H04B 1/3822* (2013.01); *H04B 5/0037* (2013.01); *H04W 4/021* (2013.01); *H04W 4/046* (2013.01)

(58) Field of Classification Search
CPC ... H04B 1/3822; H04B 5/0037; H04W 4/021; H04W 4/046
See application file for complete search history.

(56) References Cited

U.S. PATENT DOCUMENTS

| | | | |
|---|---|---|---|
| 2016/0028238 A1* | 1/2016 | Isfeldt | G01V 1/38 320/108 |
| 2016/0065005 A1* | 3/2016 | Won | H04B 5/0037 307/104 |
| 2016/0094298 A1 | 3/2016 | Isfeldt et al. | |
| 2017/0018954 A1* | 1/2017 | Lee | H02J 50/12 |
| 2017/0207658 A1* | 7/2017 | Bana | H02J 50/12 |

OTHER PUBLICATIONS

Magistretti et al., "A Mobile Delay-tolerant Approach to Long-Term Energy-Efficient Underwater Sensor Networking," IEEE, University of Bologna, 2007 (6 pages).

* cited by examiner

*Primary Examiner* — Xin Jia
(74) *Attorney, Agent, or Firm* — Griffiths & Seaton PLLC

(57) ABSTRACT

Embodiments for managing aquatic infrastructure by one or more processors are described. A vehicle is detected within a vicinity of an aquatic infrastructure device. A wireless capability level of the vehicle is determined. Based on the determined wireless capability level of the vehicle, at least one of a wireless power transfer between the vehicle and the aquatic infrastructure device or a wireless data transfer between the vehicle and the aquatic infrastructure device is enabled.

15 Claims, 11 Drawing Sheets

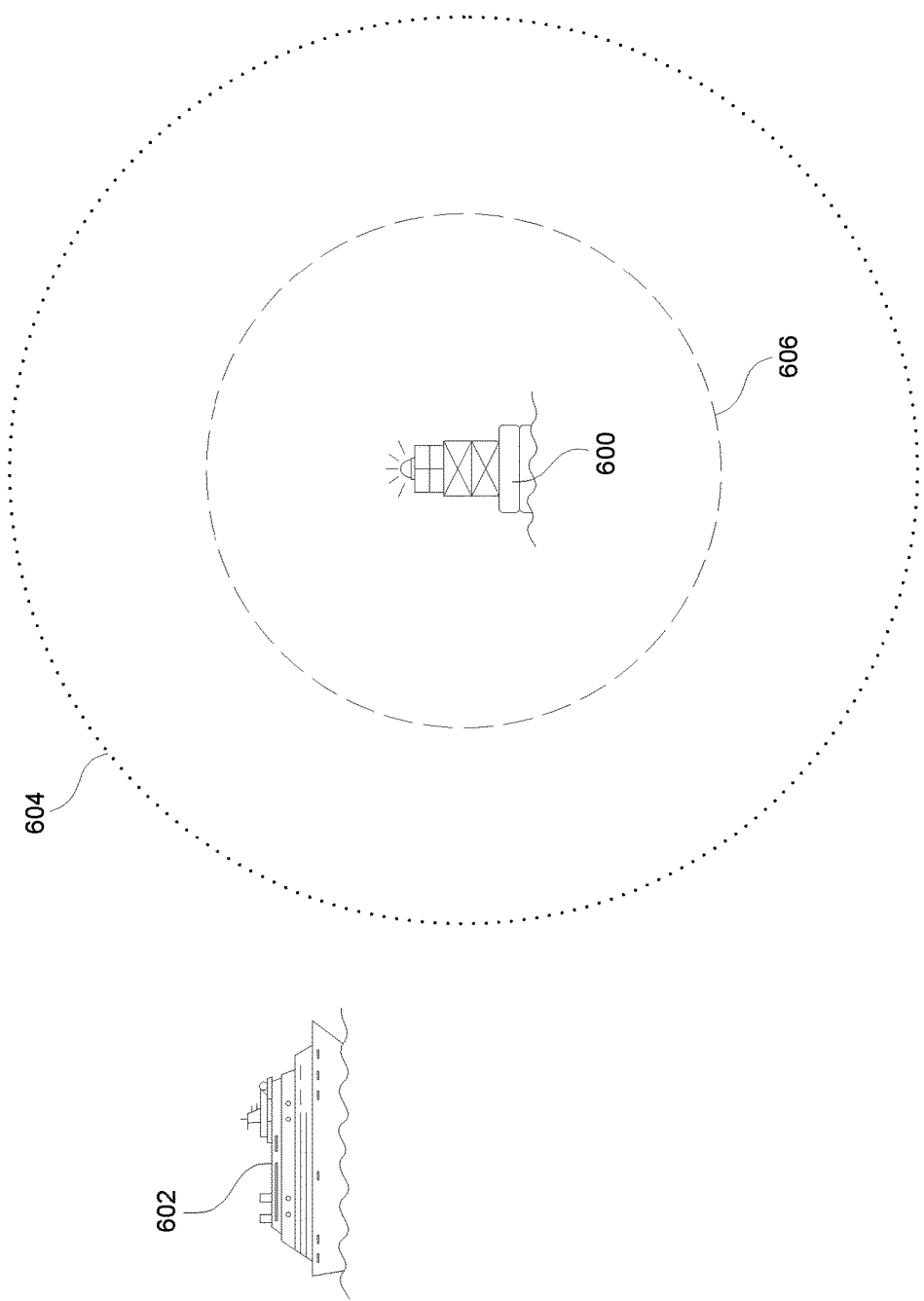

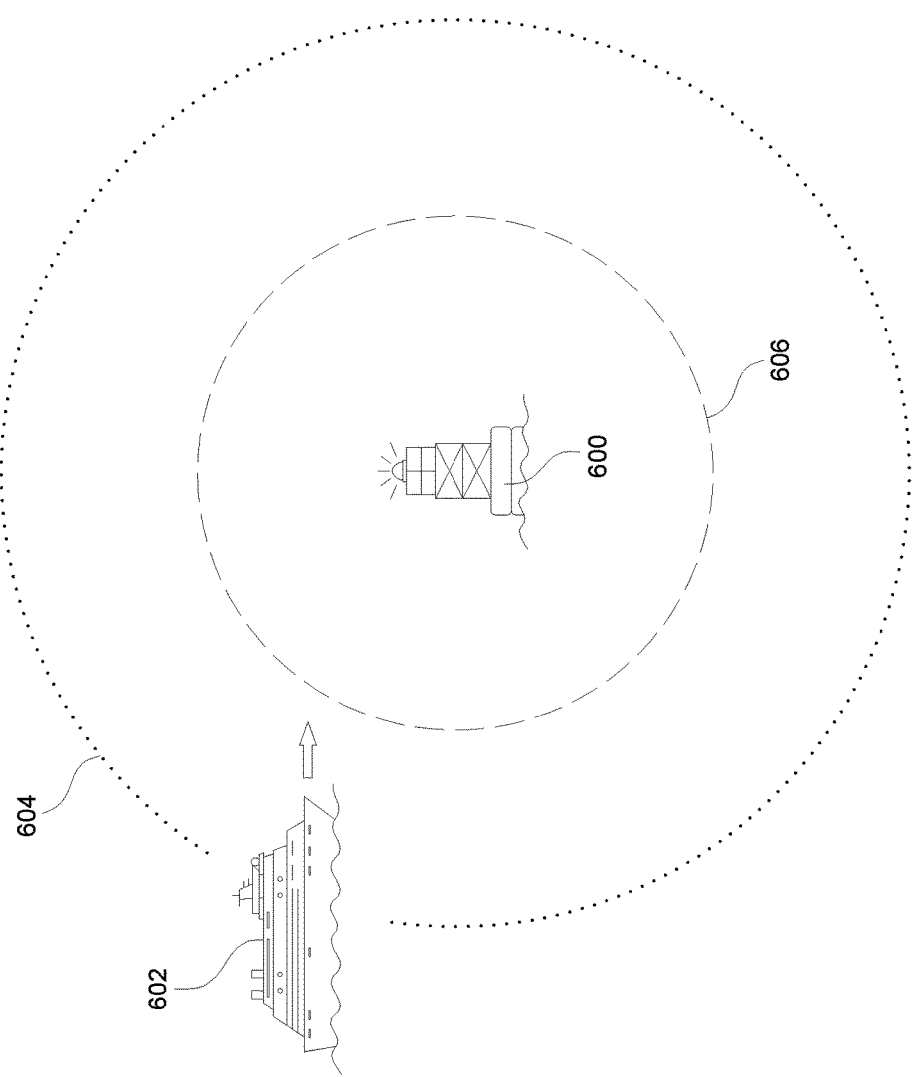

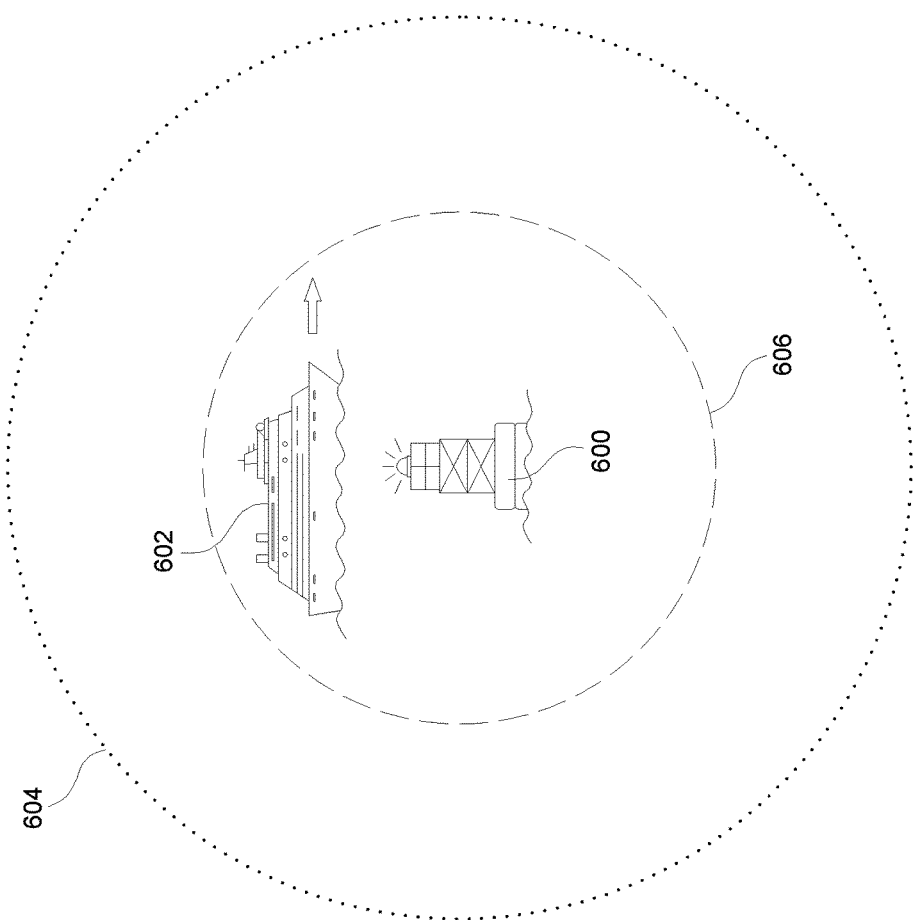

METHODS AND SYSTEMS FOR AQUATIC INFRASTRUCTURE RECHARGE AND DATA TRANSFER

BACKGROUND OF THE INVENTION

Field of the Invention

The present invention relates in general to computing systems, and more particularly, to various embodiments for recharging and transferring data from aquatic infrastructure devices, such as buoys.

Description of the Related Art

Modern aquatic infrastructure devices, such as buoys, are used to perform various tasks, including the collection of data or information. For example, some buoys (e.g., data or sensor buoys) are equipped with various types of sensors that are used to collect data about, for example, weather, waves, currents, temperature, chemical characteristics of the water, and acoustic phenomena, associated with the body of water (e.g., oceans, seas, lakes, etc.) in which they are deployed.

Often, the data is collected from the buoys manually, such as by physically retrieving the buoys (or one or more components within the buoys) or connecting an external device (e.g., a portable computing device) to the buoys to retrieve the data stored within. Some modern buoys are equipped to transfer the data wirelessly, but because of, for example, power considerations, such transfers are typically performed at relatively low data rates.

Ideally, buoys would, for example, be able to wirelessly transfer data at higher data rates while still being able to maintain sufficient power to remain deployed for extended periods of time.

SUMMARY OF THE INVENTION

Various embodiments for managing aquatic infrastructure by one or more processors are described. In one embodiment, by way of example only, a method for managing aquatic infrastructure, again by one or more processors, is provided. A vehicle is detected within a vicinity of an aquatic infrastructure device. A wireless capability level of the vehicle is determined. Based on the determined wireless capability level of the vehicle, at least one of a wireless power transfer between the vehicle and the aquatic infrastructure device or a wireless data transfer between the vehicle and the aquatic infrastructure device is enabled.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 6-10 are plan views of a buoy deployed in a body of water, illustrating a vehicle transiting the vicinity of the buoy, in accordance with aspects of the present invention;

DETAILED DESCRIPTION OF THE DRAWINGS

Figure 1:
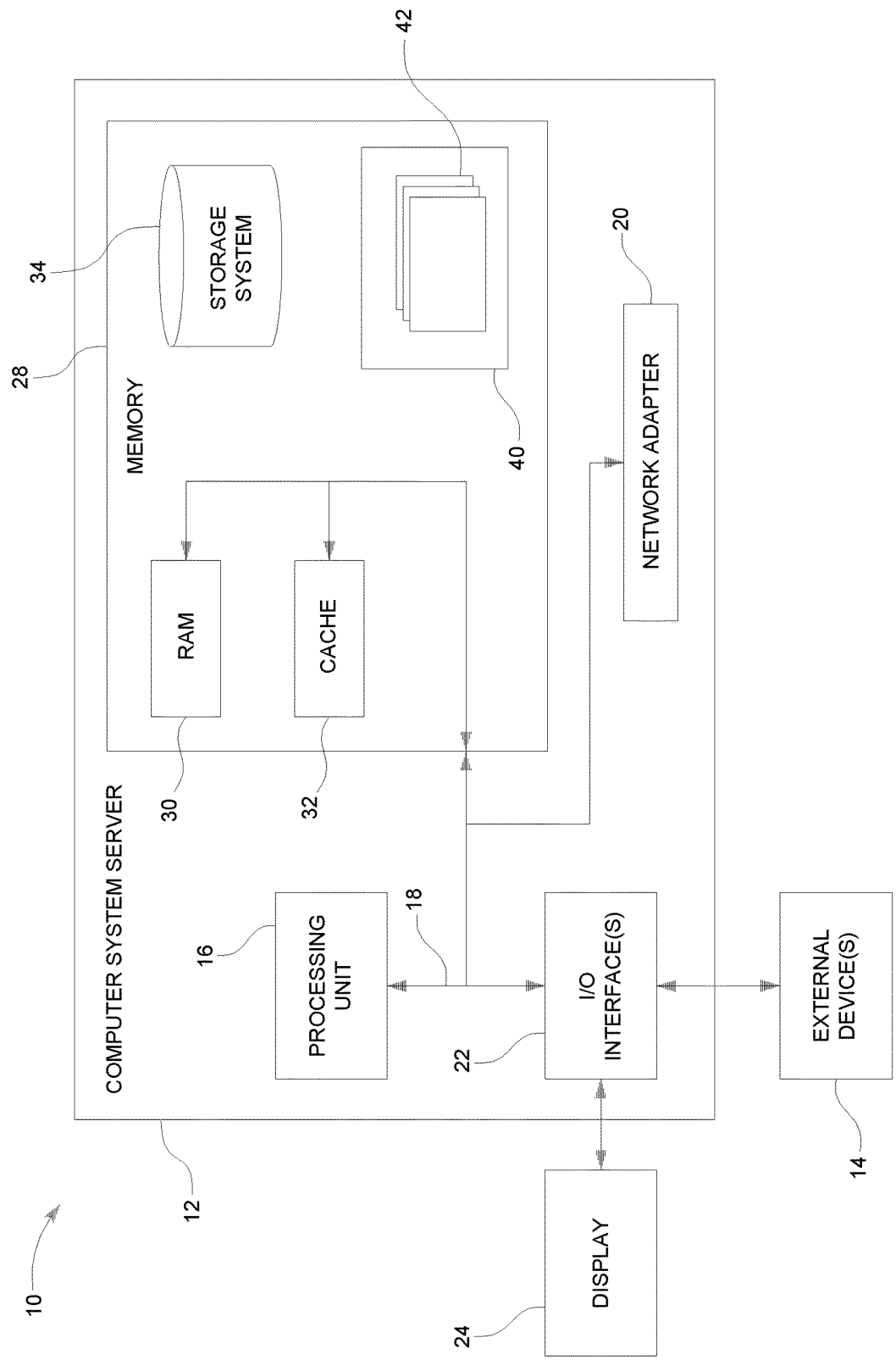
FIG. 1 is a block diagram depicting an exemplary computing node according to an embodiment of the present invention.

As previously indicated, some aquatic infrastructure devices, such as buoys, are equipped with sensors and used to collect various information about, for example, the body of water in which they are deployed and/or the weather in that region of the body of water. Typically, the data is retrieved manually from the buoys, but may also be transferred wirelessly, but at relatively low data rates. If higher data transfer rates are used, the power supplies (e.g., batteries) may be depleted at an undesirably high rate and require replacing and/or servicing relatively frequently.

For example, a weather buoy may be deployed in a particular part of an ocean to collect data about air temperature, wind speeds/directions, precipitation, barometric pressure, etc. in that vicinity. Data from the buoy may be manually retrieved, or in some instances, it may be wirelessly transmitted from the buoy, but typically at a low data rate. If higher data rates are used, the battery on the buoy may need to be frequently recharged (i.e., manually) or replaced. As such, it is not uncommon for such buoys to require frequent servicing and/or suffer from poor data rate transfers.

In view of the foregoing, a need exists for aquatic infrastructure systems that allow buoys to wirelessly transfer data at higher data rates while still being able to maintain sufficient power to remain deployed for extended periods of time.

To address these needs, the methods and systems of the present invention provide, for example, relatively high rate wireless data transfers from buoys combined with wireless charging (or re-charging) of the buoys (and/or the power supplies thereon).

In some embodiments, the methods and systems use, for example, "opportunistic" (or unscheduled) wireless data transfers to transiting vehicles (e.g., vessels or aircrafts) while also utilizing wireless charging from (or provided by), for example, the same vehicles. That is, in some embodiments, an unexpected vehicle is detected in the vicinity of a buoy. If the vehicle is capable of wirelessly receiving data from the buoy and/or providing a wireless charge to the buoy, at least one of those actions is performed. In this manner, the deployment time of the buoys may be extended and/or the data stored thereon may be accessed more quickly.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in an aquatic infrastructure device, such as a buoy, and/or a vehicle, such as a vessel or an aircraft. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
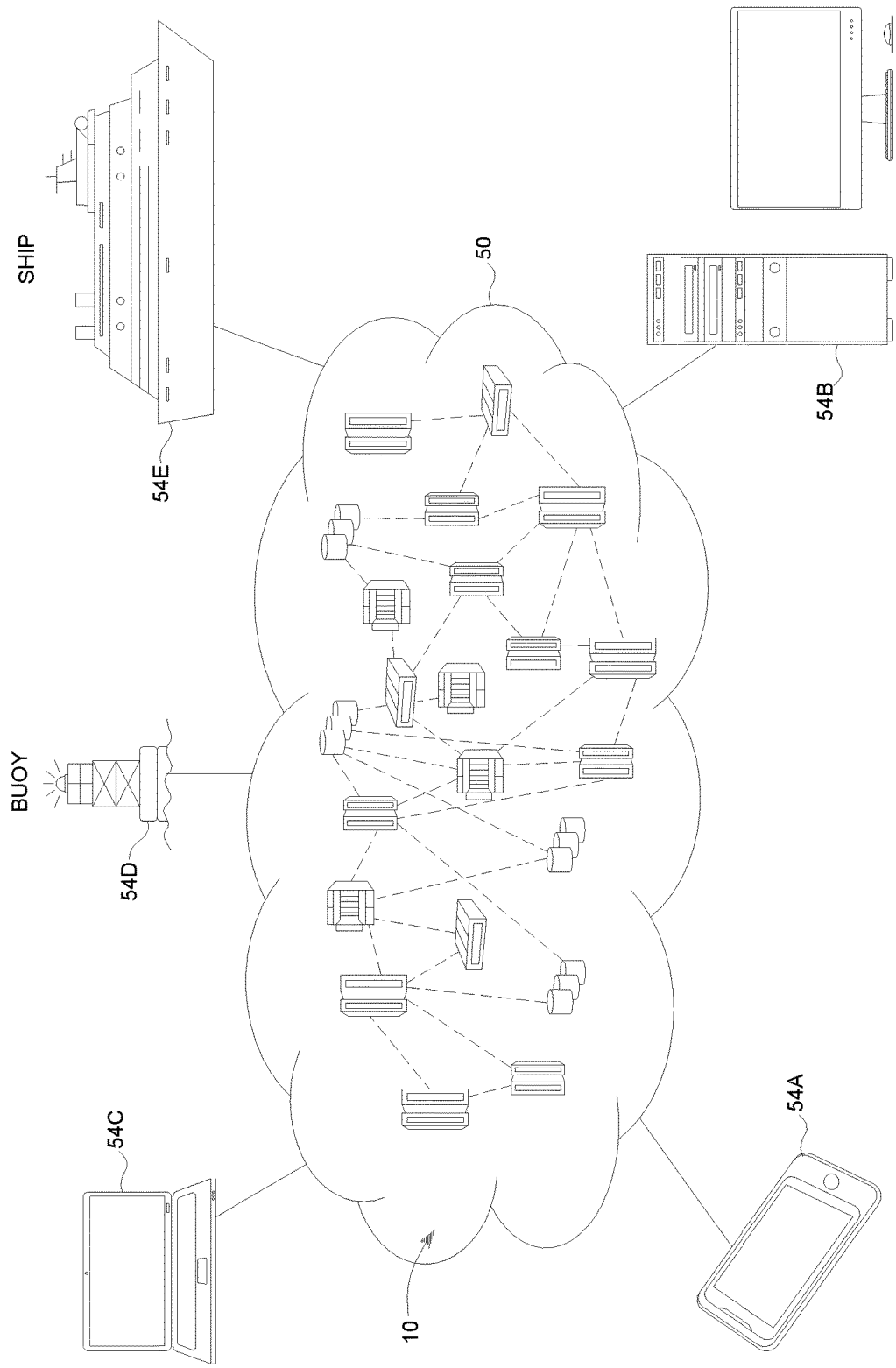
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and others computer systems, such as, for example, those in buoys 54D, and vehicles (e.g., vessels) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
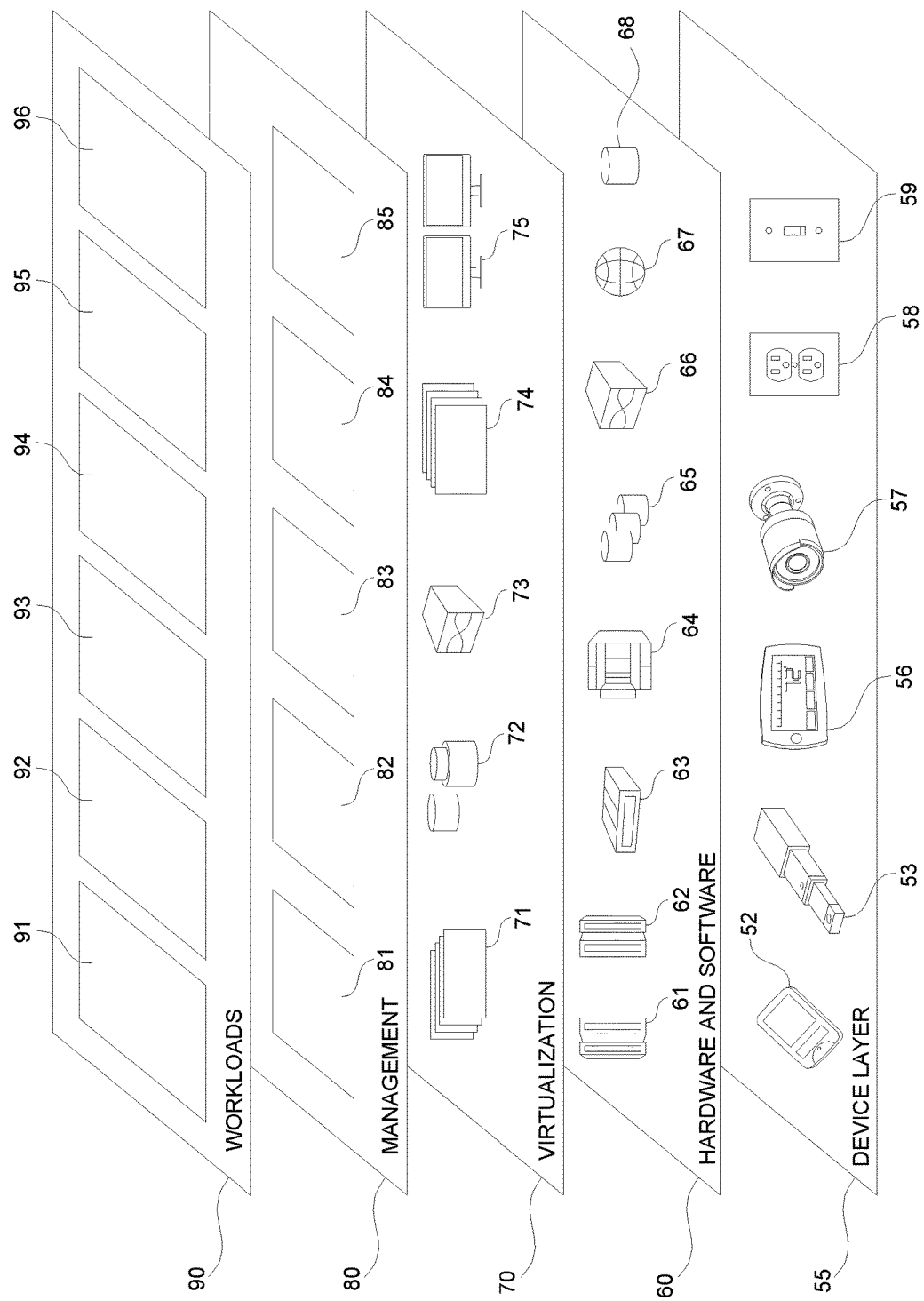
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to buoys, drones, satellites, vessels, and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing aquatic infrastructure as described herein. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing aquatic infrastructure devices, such a buoys. As will be described in greater detail below, in some embodiments, a vehicle (e.g., a vessel or aircraft) is detected within a vicinity of a buoy (e.g., a buoy equipped with one or more sensors). The wireless capabilities (and/or compatibility) of the vehicle are determined (or checked), such as by the buoy. Depending on the capabilities of the vehicle, the vehicle wirelessly transfers power to the buoy and/or wirelessly uploads data from the buoy. Whether or not a wireless power transfer and/or a wireless data transfer is performed may also depend on the proximity of the vehicle to the buoy (e.g., the distance between the vehicle and the buoy). In some embodiments, when the buoy is not receiving a wireless power transfer and/or performing a wireless data transfer, the buoy may operate in a low power (or "sleep") mode (e.g., to conserve battery power).

Figure 4:
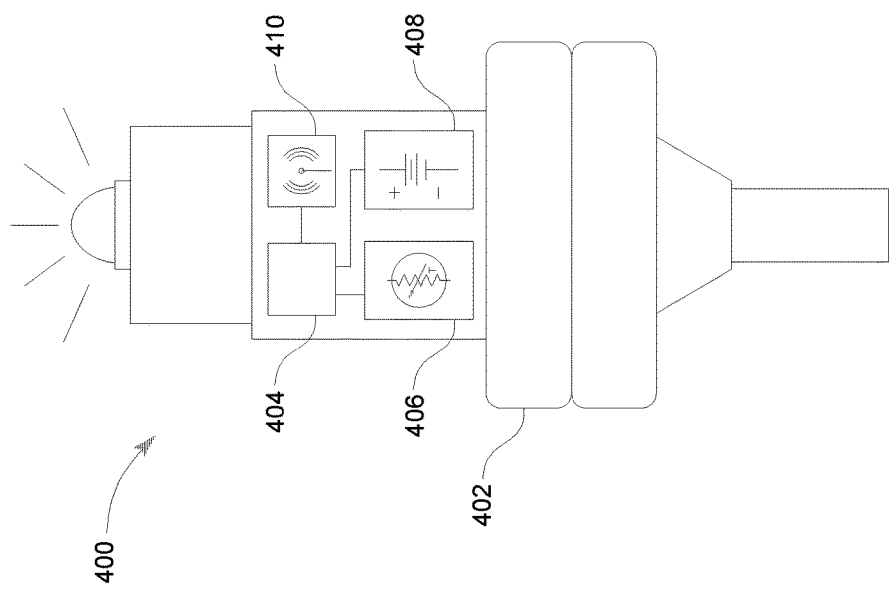
FIG. 4 is a simplified schematic view of a buoy according to an embodiment of the present invention.

Referring now to FIG. 4, an exemplary buoy 400, according to some embodiments, is illustrated in a simplified block diagram/schematic manner. The buoy 400 includes a body (or frame) 402, which as will be appreciated by one skilled in the art is configured to float (e.g., in a substantially upright orientation, as shown in FIG. 4) when deployed in a body of water. In the depicted embodiment, the buoy also includes (e.g., housed within the frame 402) a computing device 404, a sensor array 406, a power supply 408, and a transceiver 410.

Although not shown in detail, in some embodiments, the computing device 404 includes various components such as a processor, memory, etc. (e.g., the components described above with respect to the computer system 12 shown in FIG. 1) and is in operable communication (e.g., electrically connected to) with the sensor array 406, the power supply 408, and the transceiver 410. The computing device 404 may control the overall operation of the buoy 400 in accordance with the various aspects described herein. The sensor array 406 may include one or more sensors suitable for performing the intended task(s) of the buoy (e.g., collecting data related to weather, waves, currents, temperature, chemical characteristics of the water, acoustic phenomena, etc.). Although a thermistor symbol is shown in FIG. 4, this is simply intended to convey one possible type of sensor which may be included within the sensor array 406. The power supply 408 may be any power supply suitable for use in a buoy, such as one or more batteries (e.g., lithium thionyl-chloride cells). The transceiver 410 may be any suitable receiver and/or transmitter capable of, for example, enabling wireless communication (e.g., via wireless local area networks (LANs), Long-Term Evolution (LTE), LTE Advanced, etc.).

Figure 5:
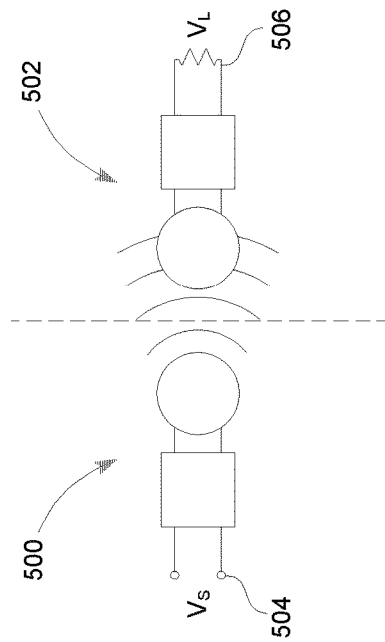
FIG. 5 is a simplified block diagram of a generic wireless power transfer system according to an embodiment of the present invention.

Referring now to FIG. 5, a generic transmitter assembly 500 and a generic receiver assembly 502 capable of enabling a wireless power transfer are shown. In some embodiments, the transmitter assembly 500 is coupled to (or housed within) a vehicle (e.g., a vessel or aircraft), and the receiver assembly 502 is coupled to (or housed within) a buoy (e.g., within the sensor array 406, the transceiver 410, and/or the transceiver 410 of buoy 400 shown in FIG. 4). The transmitter assembly 500 is connected to a power supply ($V_S$) 504 (e.g., onboard the vehicle), such as a battery or a generator, and the receiver assembly 502 is connected to a load ($V_L$) 506 (e.g., onboard the buoy) that is used to, for example, charge (or re-charge) the power supply 408. Although not shown in detail, but will be appreciated by one skilled in the art, the transmitter assembly 500 may include a device capable of converting power (e.g., from the power supply 504) into, for example, a time-varying electromagnetic field, such as a coil of wire, one or more conductive plates, an antenna, or a laser. The receiver assembly 502 may include a similar device that receives (or collects) the electromagnetic field and converts it into current which is provided to the load 506 (e.g., to charge the power supply 408 on the buoy 400).

FIGS. 6-10 illustrate an exemplary buoy 600 (e.g., buoy 400 described above) deployed in a body of water, such as an ocean or sea, when operated in accordance with some aspects of the present invention. The buoy 600 may be stationary (e.g., anchored) or may be freely drifting with the currents, waves, etc. of the body of water. As shown in FIG. 6, a vehicle, in this case a vessel 602, is detected in the general vicinity of the buoy 600. It should be understood that although a vessel (e.g., a ship) is shown in FIGS. 6-10, in other embodiments, other vehicles, such as aircrafts (e.g., unmanned aerial vehicles (UAVs)) may be used. The detection of the vessel 602 may be performed by, for example, the buoy 600 detecting a wireless signal being emitted from the vessel 602. However, in some embodiments, global positioning satellite (GPS) coordinates, satellite imaging, etc. may be used. It should be noted that, in at least some embodiments, the proximity of the vessel 602 (or other vehicle) to the buoy 600 is unexpected and/or unscheduled. Rather, the vessel 602 just happens to be passing through (or transiting) the area in which the buoy 600 is deployed.

In the depicted embodiment, two ranges (or perimeters or areas), range 604 and range 606, are shown. Range 604 may correspond to the proximity (or area) in which the vessel 602 must be in order for a wireless data transfer between the vessel 602 and the buoy 600 to occur (i.e., data range 604), and range 606 may correspond to the proximity in which the vessel 602 must be in order for a wireless power transfer between the vessel 602 and the buoy 600 to occur (i.e., power range 606). In other words, the ranges 604 and 606 may indicate how close the vessel 602 needs to be to the buoy 600 in order for a wireless data transfer and a wireless power transfer, respectively, to be performed. In the depicted embodiment, data range 604 is larger than and completely encompasses power range 606. It should be understood that the sizes of the ranges 604 and 606 (i.e., the distances) may vary depending on various factors, such as the type of wireless technology used and environmental conditions (e.g., waves, weather, etc.).

In the depicted embodiment, the vessel 602 is detected while the vessel 602 is outside of data range 604 (e.g., by the buoy 600 detecting a relatively weak wireless signal emanating from the vessel 602). However, it should be understood that in some embodiments the vessel 602 may not be detected until the vessel 602 is within data range 604. In some embodiments, the wireless capabilities (or a wireless capability level) of the vessel 602 are first determined (e.g., by the buoy 600). For example, the buoy 600 may send an inquiry to the vessel 602, which responds providing information about the wireless network and/or wireless power transfer characteristics/capabilities of the vessel 602. Alternatively, the wireless signal emitted by the vessel 602 may be encoded in such a way that the buoy 600 is able to recognize or determine the appropriate information concerning the wireless capabilities of the vessel 602. This information may be used to determine whether or not the vessel 602 is capable of retrieving data from the buoy 600 and/or providing a wireless charge to the buoy 600 (e.g., the extent to which wireless systems of the vessel 602 and the buoy 600 are compatible). For the example shown below in FIGS. 7-10, it should be assumed that the vessel 602 and the buoy 600 are compatible with respect to wireless data transfers and wireless power transfers.

As shown in FIG. 7, the vessel 602 crosses into data range 604, which may be determined by, for example, an increase in the strength of the wireless signal emanating from the vessel 602 by the buoy 600. In some embodiments, a wireless data transfer between the buoy 600 and the vessel 602 is then performed. For example, data (or information) collected by sensors onboard the buoy 600 (e.g., related to weather or ocean conditions) and stored in a memory on the buoy 600, may be wirelessly transferred to the vessel 602. The data transfer may continue to be performed so long as the vessel 602 is within data range 604, or until all appropriate data has been uploaded to the vessel 602.

Referring now to FIG. 8, when the vessel crosses into the power range 606, a wireless power transfer between the vessel 602 and the buoy 600 may be performed. The presence of the vessel 602 within the power range 606 may be determined by, detecting an (additional) increase in the signal strength of the wireless signal emanating from the vessel 602 (e.g., the same signal associated with the data transfer or another wireless signal). The power transfer may continue to be performed so long as the vessel 602 is within power range 606, or until the battery on the buoy 600 is fully charged.

Figure 9:
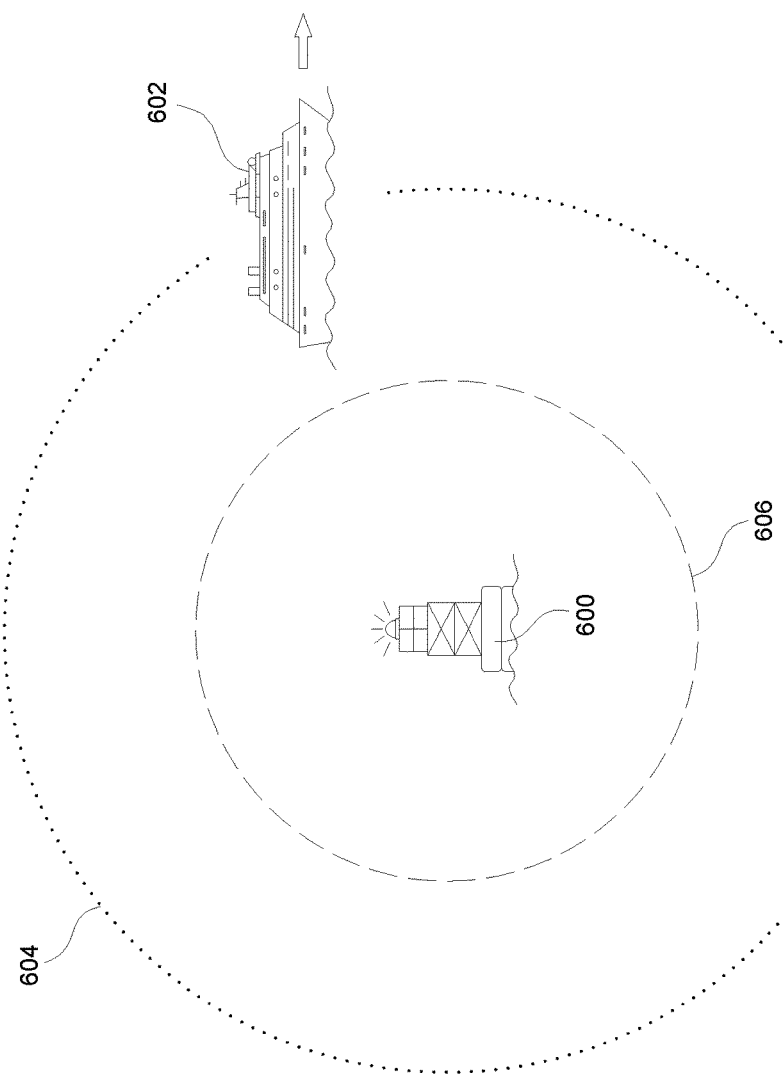

In the depicted embodiment, as shown in FIG. 9, the vessel 602 then travels out of the power range 606, but remains within the data range 604. After leaving the power range 606, the wireless power transfer may cease. However, in some embodiments, the wireless data transfer may continue as long as the vessel remains within the data range 604.

Figure 10:
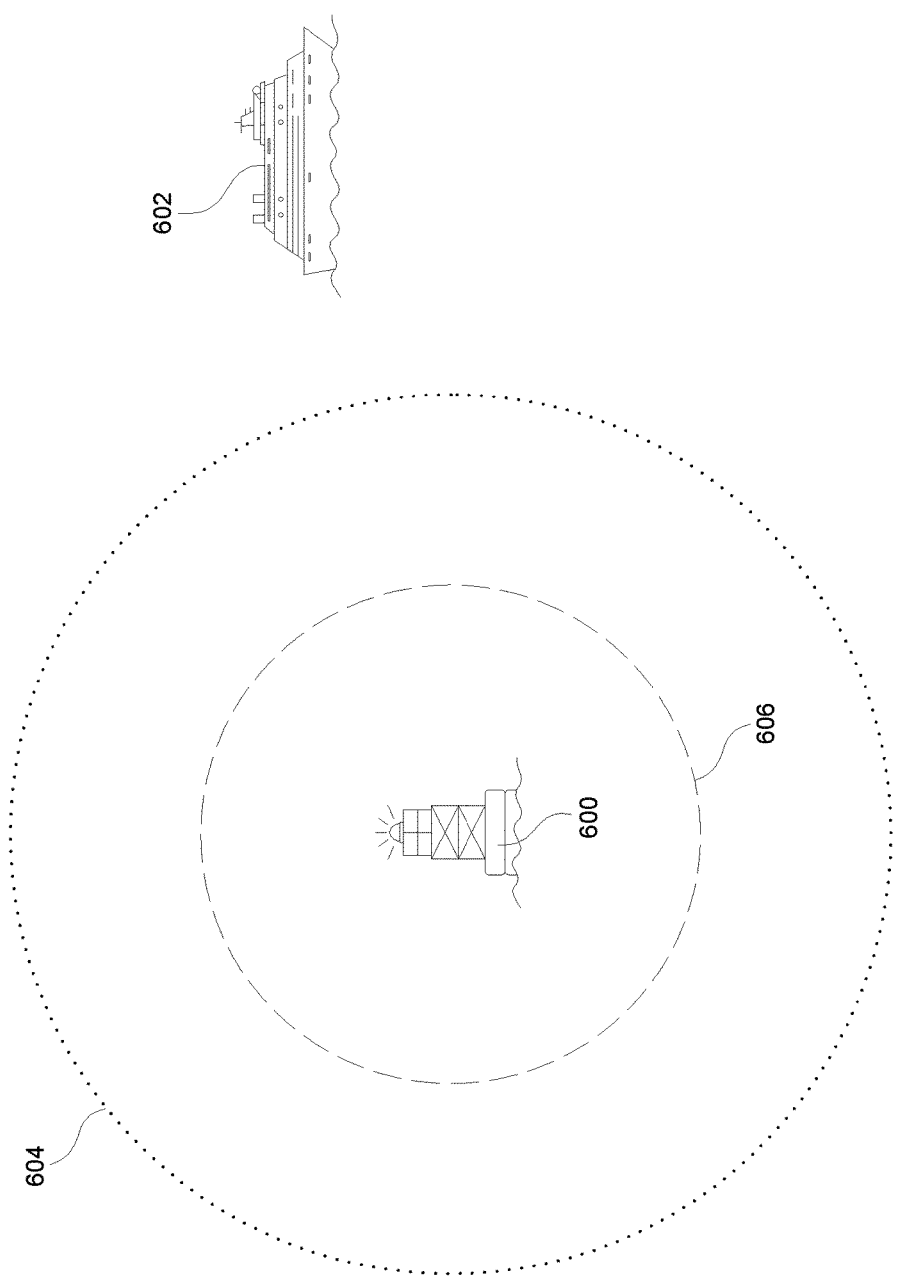

As shown in FIG. 10, the vessel 602 then travels out of the data range 604, at which point the wireless data transfer may be ceased. In some embodiments, after the data transfer has been ceased, the buoy 600 (and/or a computing device thereon) may delete the data that has been wirelessly transferred (e.g., to free up storage space), and the data may be uploaded to an appropriate system from the vessel 602. In some embodiments, the buoy 600 may then return to (or initiate) a low power mode, as described above (e.g., until another vehicle is detected).

Figure 11:
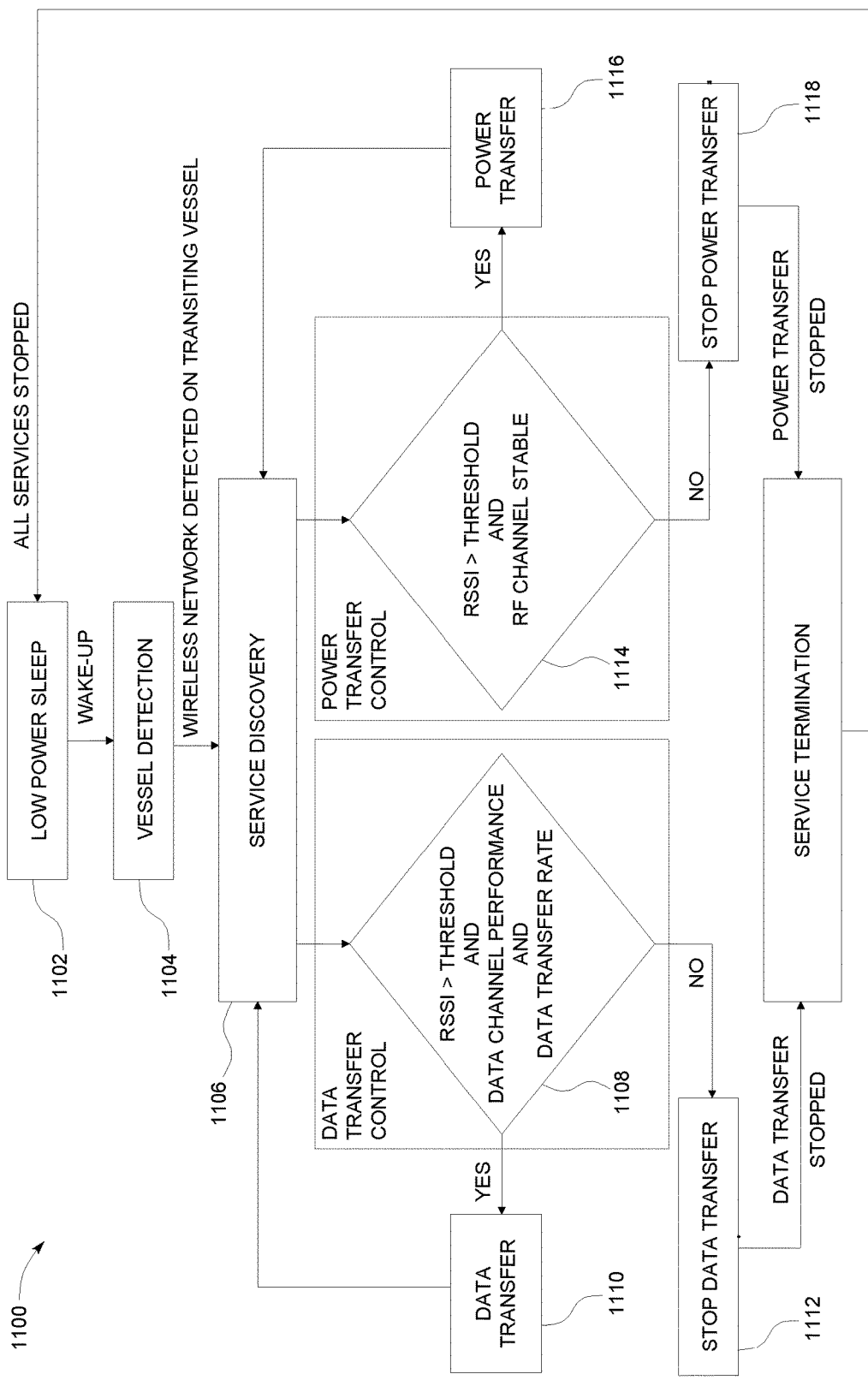
FIG. 11 is a block/flow diagram illustrating certain aspects of functionality according to the present invention.

FIG. 11 is a simplified functional block diagram/flowchart 1100 of the methods and/or systems described herein according to some embodiments. Low power sleep module (or block) 1102 causes the aquatic infrastructure device (e.g., a buoy) to operate (or function) in a low power mode. In some embodiments, when the buoy is in the low power mode, the wireless capabilities of the buoy are disabled, but the buoy may collect data using the onboard sensors.

Vessel detection module 1104 detects the presence of a vessel (or aircraft) within the vicinity of the buoy. As described above, the detection of the vessel may be performed by detecting a wireless network emanating from the vessel. Service discovery module 1106 may determine the wireless capabilities of the vessel (and/or the compatibility of the wireless capabilities of the vessel with those of the buoy) and detect the conditions which may be used to determine whether or not a wireless data transfer and/or a wireless power transfer are possible (e.g., signal strength, channel performance/stability, transfer rate, etc.)

Data transfer control module 1108 determines whether or not a wireless data transfer is possible based on, for example, a received signal strength indication (RSSI), data channel performance, and/or possible data transfer rate. If the data transfer control module 1108 determines that a wireless data transfer can be performed, the data transfer is performed by data transfer module 1110. After the data transfer is initiated, the service discovery module 1106 again detects the pertinent characteristics, and the data transfer control module 1108 determines whether or not to continue the data transfer. If the data transfer control module 1108 determines that a wireless data transfer cannot be performed (and/or should be ceased), stop data transfer module 1112 prevents (and/or ceases) the data transfer.

Power transfer control module 1114 determines whether or not a wireless power transfer is possible based on, for example, a received signal strength indication (RSSI) and a radio frequency (RF) channel stability. If the power transfer control module 1114 determines that a wireless power transfer can be performed, the power transfer is performed by power transfer module 1116. After the power transfer is initiated, the service discovery module 1106 again detects the pertinent characteristics, and the power transfer control module 1114 determines whether or not to continue the power transfer. If the power transfer control module 1114 determines that a wireless power transfer cannot be performed (and/or should be ceased), stop power transfer module 1118 prevents (and/or ceases) the power transfer.

When neither a wireless data transfer nor a wireless power transfer is being performed, service termination module 1120 causes the buoy to return to the low power mode (e.g., low power sleep module) 1102.

Figure 12:
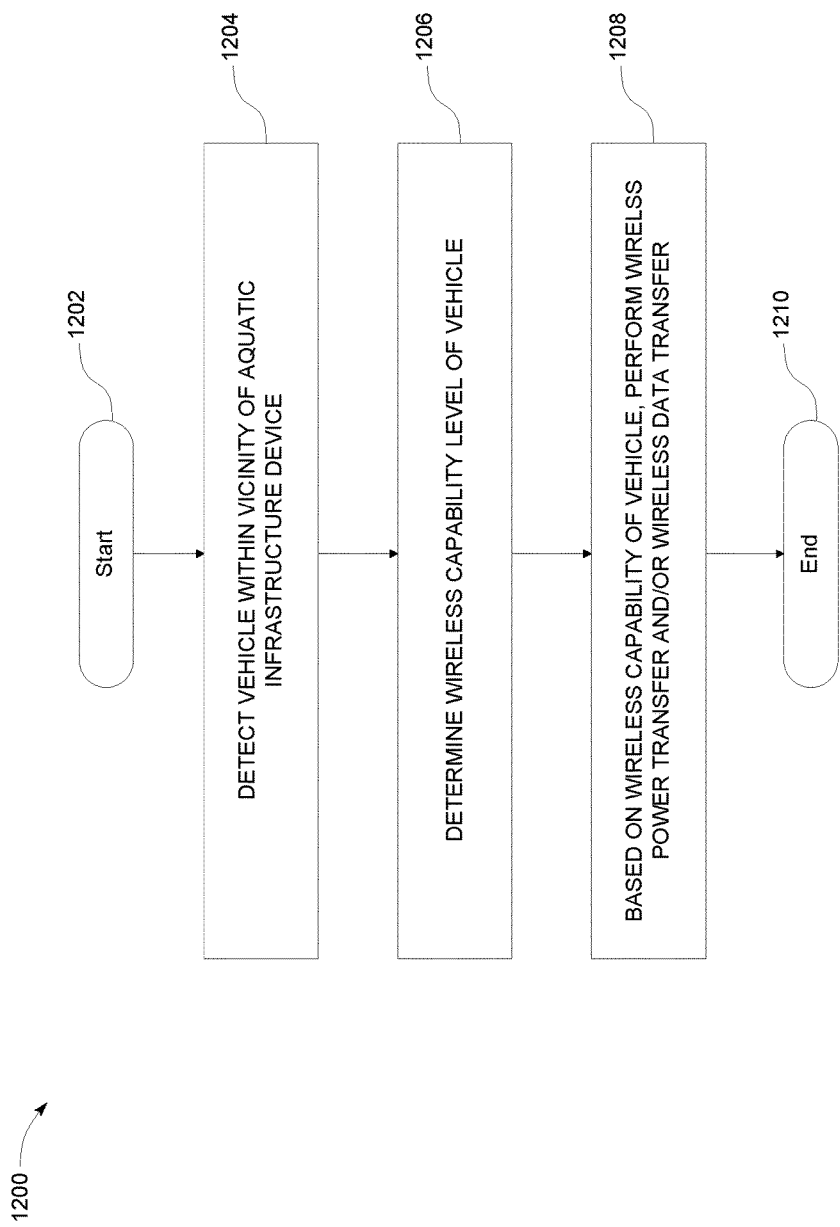
FIG. 12 is a flowchart diagram depicting an exemplary method for managing aquatic infrastructure in which various aspects of the present invention may be implemented.

Turning to FIG. 12, a flowchart diagram of an exemplary method 1200 for managing aquatic infrastructure, in accordance with various aspects of the present invention, is illustrated. Method 1200 begins (step 1202) with, for example, an aquatic infrastructure device, such as a buoy, being deployed in a body of water (e.g., an ocean or sea) and, for example, operating in a low power/sleep mode (e.g., collecting data using onboard sensors).

A vehicle is detected within the vicinity of the aquatic infrastructure device (step 1204). The vehicle may be, for example, a vessel (e.g., a ship) or an aircraft (e.g., a UAV). The detection of the vehicle may occur by a wireless network emanating from the vehicle being detected by the aquatic infrastructure device.

A wireless capability level of the vehicle is then determined (step 1206). The determination of the wireless capabilities may be performed by, for example, the aquatic infrastructure device sending an inquiry to the vehicle and/or the wireless signal emitted by the vehicle may be encoded in such a way that the aquatic infrastructure device is able to recognize or determine the appropriate information concerning the wireless capabilities of the vehicle. In some embodiments, the determining of the wireless capabilities of the vehicles (also) includes determining the extent to which the wireless capabilities of the vehicle are compatible with those of the aquatic infrastructure device and/or determining whether or not wireless services (e.g., data transfer and/or power transfer) are possible under the particular circumstances (e.g., signal strength, signal stability, environmental conditions, distance between the vehicle and the device, etc.).

Based on the wireless capabilities (and/or compatibility) of the vehicle, a wireless power transfer and/or a wireless data transfer between the vehicle and the aquatic infrastructure device is then performed (step 1208). As described above, a wireless power transfer may be performed by causing a time-varying electromagnetic field to be generated from within the vehicle, which is then received on the aquatic infrastructure device and converted into power. A wireless data transfer may include wirelessly transmitting data stored on the aquatic infrastructure device (e.g., sensor data) to the vehicle.

Method 1200 ends (step 1210) with, for example, the wireless power transfer and/or the wireless data transfer ceasing. In some embodiments, the wireless power transfer and/or the wireless data transfer are continued as long as possible (e.g., the vehicle remains within suitable range).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a one or more processors, for managing aquatic infrastructure, comprising:

detecting a vehicle within a vicinity of an aquatic infrastructure device; the aquatic infrastructure device including at least one sensor and a memory in operable communication with the sensor, wherein the at least one sensor monitors and collects data associated with weather, wave and current information, temperature, and water chemical characteristics, and wherein the data generated by the at least one sensor is stored in the memory;

determining a wireless capability level of the vehicle by the aquatic infrastructure device; wherein the determining of the wireless capability level of the vehicle includes determining if the vehicle is capable of wirelessly transferring power to the aquatic infrastructure device and determining if the vehicle is capable of wirelessly receiving data from the aquatic infrastructure device; and based on the determined wireless capability level of the vehicle, enabling at least one of a wireless power transfer between the vehicle and the aquatic infrastructure device or a wireless data transfer between the vehicle and the aquatic infrastructure device.

2. The method of claim 1, wherein the enabling of the at least one of a wireless power transfer between the vehicle and the aquatic infrastructure device or a wireless data transfer between the vehicle and the aquatic infrastructure device includes causing at least some of the data stored in the memory of the aquatic infrastructure device to be wirelessly transmitted to the vehicle.

3. The method of claim 1, wherein the vehicle includes a transmitter, and the aquatic infrastructure device includes a receiver and a battery coupled to the receiver, and wherein the enabling of the at least one of a wireless power transfer between the vehicle and the aquatic infrastructure device or a wireless data transfer between the vehicle and the aquatic infrastructure device includes:

causing a time-varying electromagnetic field to be generated by the transmitter; and causing the time-varying electromagnetic field to be converted into a current by the receiver to charge the battery.

4. The method of claim 3, wherein the time-varying electromagnetic field includes at least one of a time-varying electric field or a time-varying magnetic field.

5. The method of claim 1, wherein the vehicle is a vessel, and the aquatic infrastructure device is a stationary buoy.

6. A system for managing aquatic infrastructure, comprising:

at least one processor that detects a vehicle within a vicinity of an aquatic infrastructure device; the aquatic infrastructure device including at least one sensor and a memory in operable communication with the sensor, wherein the at least one sensor monitors and collects data associated with weather, wave and current information, temperature, and water chemical characteristics, and wherein the data generated by the at least one sensor is stored in the memory;

determines a wireless capability level of the vehicle by the aquatic infrastructure device; wherein the determining of the wireless capability level of the vehicle includes determining if the vehicle is capable of wirelessly transferring power to the aquatic infrastructure device and determining if the vehicle is capable of wirelessly receiving data from the aquatic infrastructure device; and based on the determined wireless capability level of the vehicle, enables at least one of a wireless power transfer between the vehicle and the aquatic infrastructure device or a wireless data transfer between the vehicle and the aquatic infrastructure device.

7. The system of claim 6, wherein the enabling of the at least one of a wireless power transfer between the vehicle and the aquatic infrastructure device or a wireless data transfer between the vehicle and the aquatic infrastructure device includes causing at least some of the data stored in the memory of the aquatic infrastructure device to be wirelessly transmitted to the vehicle.

8. The system of claim 6, wherein the vehicle includes a transmitter, and the aquatic infrastructure device includes a receiver and a battery coupled to the receiver, and wherein the enabling of the at least one of a wireless power transfer between the vehicle and the aquatic infrastructure device or a wireless data transfer between the vehicle and the aquatic infrastructure device includes:
   causing a time-varying electromagnetic field to be generated by the transmitter; and
   causing the time-varying electromagnetic field to be converted into a current by the receiver to charge the battery.

9. The system of claim 8, wherein the time-varying electromagnetic field includes at least one of a time-varying electric field or a time-varying magnetic field.

10. The system of claim 6, wherein the vehicle is a vessel, and the aquatic infrastructure device is a stationary buoy.

11. A computer program product for managing aquatic infrastructure by one or more processors, the computer program product comprising a non-transitory computer-readable storage medium having computer-readable program code portions stored therein, the computer-readable program code portions comprising:
   an executable portion that detects a vehicle within a vicinity of an aquatic infrastructure device; the aquatic infrastructure device including at least one sensor and a memory in operable communication with the sensor, wherein the at least one sensor monitors and collects data associated with weather, wave and current information, temperature, and water chemical characteristics, and wherein the data generated by the at least one sensor is stored in the memory;
   an executable portion that determines a wireless capability level of the vehicle by the aquatic infrastructure device; wherein the determining of the wireless capability level of the vehicle includes determining if the vehicle is capable of wirelessly transferring power to the aquatic infrastructure device and determining if the vehicle is capable of wirelessly receiving data from the aquatic infrastructure device; and
   an executable portion that based on the determined wireless capability level of the vehicle, enables at least one of a wireless power transfer between the vehicle and the aquatic infrastructure device or a wireless data transfer between the vehicle and the aquatic infrastructure device.

12. The computer program product of claim 11, wherein the enabling of the at least one of a wireless power transfer between the vehicle and the aquatic infrastructure device or a wireless data transfer between the vehicle and the aquatic infrastructure device includes causing at least some of the data stored in the memory of the aquatic infrastructure device to be wirelessly transmitted to the vehicle.

13. The computer program product of claim 11, wherein the vehicle includes a transmitter, and the aquatic infrastructure device includes a receiver and a battery coupled to the receiver, and wherein the enabling of the at least one of a wireless power transfer between the vehicle and the aquatic infrastructure device or a wireless data transfer between the vehicle and the aquatic infrastructure device includes:
   causing a time-varying electromagnetic field to be generated by the transmitter; and
   causing the time-varying electromagnetic field to be converted into a current by the receiver to charge the battery.

14. The computer program product of claim 13, wherein the time-varying electromagnetic field includes at least one of a time-varying electric field or a time-varying magnetic field.

15. The computer program product of claim 11, wherein the vehicle is a vessel, and the aquatic infrastructure device is a stationary buoy.

* * * * *